United States Patent [19]

Suttles

[11] 4,389,034
[45] Jun. 21, 1983

[54] UNDERWATER PIPE ANCHORING DEVICE

[75] Inventor: Jefferies C. Suttles, Houston, Tex.

[73] Assignee: Anchoring International, Inc., Houston, Tex.

[21] Appl. No.: 170,916

[22] Filed: Jul. 21, 1980

[51] Int. Cl.³ ............................................. F16L 1/04
[52] U.S. Cl. ........................................ 248/49; 52/157;
52/165; 248/74 R; 405/172
[58] Field of Search ............. 405/154, 172, 232, 251;
52/155, 157, 165; 248/49, 74 R

[56] References Cited

U.S. PATENT DOCUMENTS

| | | |
|---|---|---|
| 2,373,439 | 4/1945 | Wheatley . |
| 3,170,663 | 2/1965 | Fite ......................................... 248/49 |
| 3,377,077 | 4/1968 | Hollander et al. ............... 52/157 X |
| 3,399,646 | 9/1968 | Vincent . |
| 3,427,812 | 2/1969 | Hollander . |
| 3,479,830 | 11/1969 | Ostarly ................................ 405/172 |
| 3,523,669 | 8/1970 | Avallone . |
| 3,568,455 | 3/1971 | McLaughlin et al. ............ 248/49 X |
| 3,779,027 | 12/1973 | Murphy . |
| 3,841,105 | 10/1974 | Cannon . |
| 3,903,704 | 9/1975 | Spiridonov . |
| 4,059,872 | 11/1977 | Delesandri ..................... 248/74 R X |
| 4,268,189 | 5/1981 | Good .................................... 405/154 |

Primary Examiner—David H. Corbin
Attorney, Agent, or Firm—Pravel, Gambrell, Hewitt, Kirk & Kimball

[57] ABSTRACT

An underwater pipe anchoring device is adapted to be connected to an anchor for anchoring the pipe to underwater strata. A first support section is shaped to engage a first portion of the outer surface of the pipe and a second support section is shaped to engage a second portion of the outer surface of the pipe. A hinge connects an end of the second support section to the first support section so that the second support section can swing into and out of a position where the support sections surround the pipe and engage opposite sides of the outer surface of the pipe. The end of the second support section opposite the hinge is releasably connected to the first support section so that the support sections can be connected for supporting the pipe. Metal-to-metal contact between the support sections and pipe is prevented for protecting the pipe.

10 Claims, 4 Drawing Figures

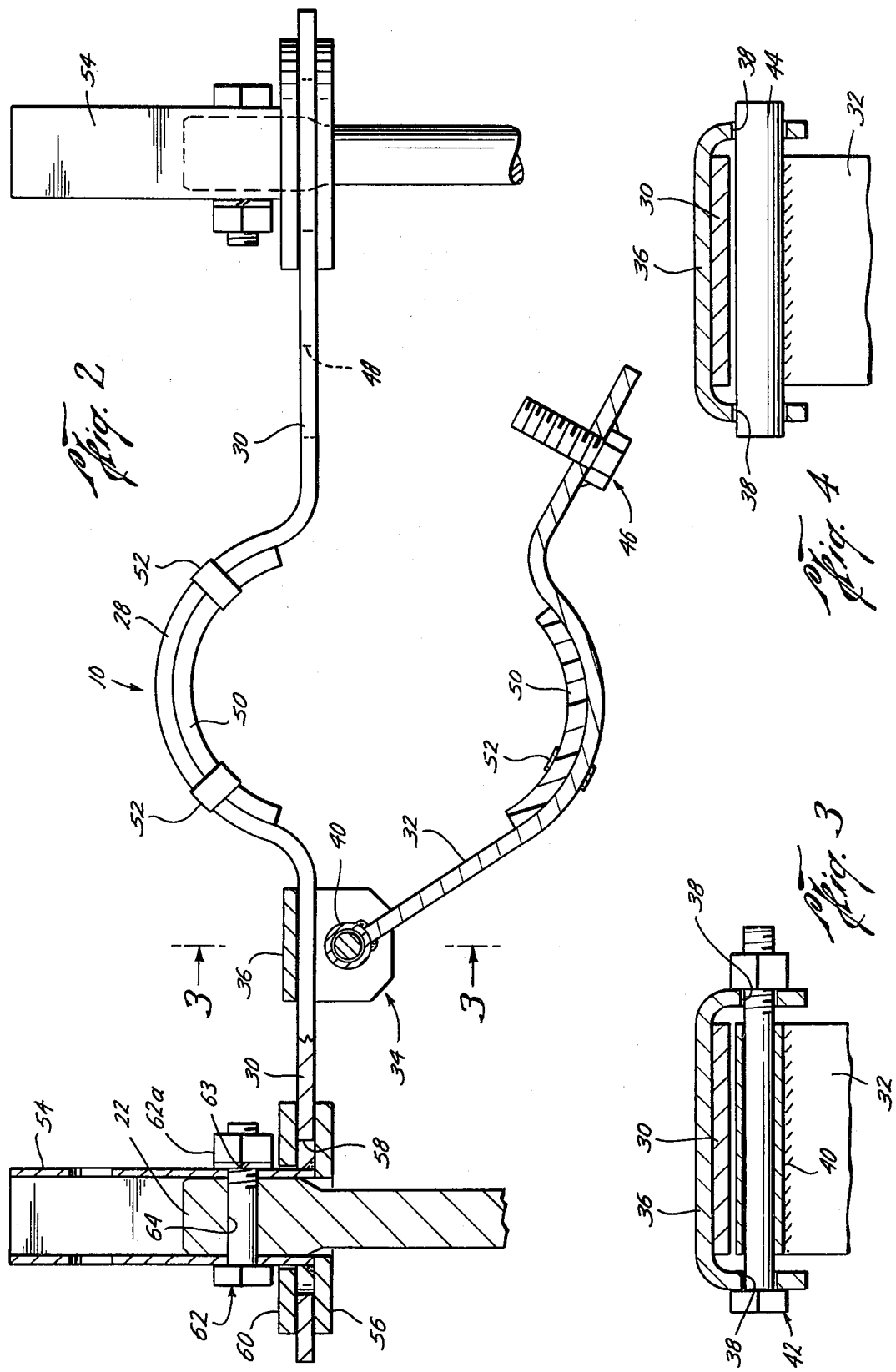

UNDERWATER PIPE ANCHORING DEVICE

BACKGROUND OF THE INVENTION

This invention relates to the installation of underwater pipe and, more particularly, to an anchoring device useful for supporting pipe which runs underwater.

Mechanical anchoring devices are designed to support underwater pipe against buoyancy, axial and lateral movement and sagging. Since underwater pipe is formed of a rigid material which has a relatively limited range of movement before it ruptures or tears loose from its terminal such as a drilling platform or the like, anchoring devices have been developed to engage the pipe and restrain it against unacceptable movement.

Installation of anchoring mechanisms used in the past is a time-consuming operation which in many cases requires the assistance of one or more divers. Since underwater divers are expensive, diver time must be kept to a minimum in order to maintain installation expenses within reasonable limits.

Anchoring devices of the type used in the past have normally included a curved plate to engage the upper pipe surface and anchoring devices connected to portions of the plate which project from both sides of the plate, which are drilled into the underwater surface for holding the plate in place. A piece of angle iron or a bar was either welded or bolted to the upper plate for engaging the lower surface of the pipe. In the case where bolts were used, pressure was not uniformly applied to the pipe surface causing the coating to chip when the bolts were tightened. Both the welding operation and installation of the four bolts which were normally used are time-consuming and expensive when done underwater.

SUMMARY OF THE INVENTION

An underwater pipe anchoring device has been developed in accordance with the invention which grips the pipe in a way in which pressure is applied uniformly around the pipe surface, is simple to operate and can be installed in significantly less time than prior art devices.

The pipe anchoring device includes a bracket assembly which surrounds the pipe. As with prior art devices, an anchor is connected to the bracket assembly on each side of the pipe which are drilled into underwater strata for holding the bracket assembly and pipe in place.

The bracket assembly includes a first support section which is shaped to engage the upper surface of the pipe and includes lateral projections on opposite sides of the pipe to which the anchors can be connected. The bracket assembly further includes a second support section shaped to engage the lower surface of the pipe and a hinge for connecting one end of the second support section to the first support section so that the second support section can swing into and out of engagement with the pipe. The outer end of the second support section includes an opening which when the support sections are closed aligns with a similarly shaped opening in the top support section in which a suitable nut and bolt can be installed for holding the sections together. Protective pads are provided between the support sections and the pipe for protecting the pipe from the support sections and maintaining the cathodic protection for the pipe by preventing any metal-to-metal contact between the supports and pipe.

The anchors include elongated rods with helical anchoring portions on the end which can be driven into the underwater strata. The lateral projections on the bracket include openings which are adapted to receive an upper drive head portion of the anchor rod, the drive heads having a smaller cross-sectional dimension than the openings and being shaped to be engaged and rotated by a suitable tool. A drive coupling, also of a smaller cross-sectional dimension than the openings, is adapted to fit over each drive head and is connected to a lower bearing washer which is larger than the openings for engaging the lower surface of the projections and holding the bracket assembly in place. The coupling projects upwardly through the openings and an upper bearing washer which is larger than the openings and has a central opening through which the coupling can project is placed over the coupling and rests on the upper surface of the projections. A suitable bolt and nut are inserted through holes in the coupling and drive head for holding them together and preventing the bracket assembly from being pulled off of the couplings.

With this type of device anchoring of underwater pipe is a simple task. The anchors can be drilled into the underwater surface and a bracket assembly installed on the anchors. The anchors can then be drilled a short distance until the upper section of the bracket engages the pipe. The connection between the apparatus and the pipe is completed simply by swinging the lower support section into place and installing a suitable nut onto a bolt which is welded on the second support section.

Since the only items which need to be installed are the nuts and bolts on the drive couplings and the nut on the bracket assembly, no special welding or cutting is necessary and diver time is significantly minimized for reducing installation costs because of the relatively small number of manipulative steps. The bracket assembly is also designed to apply uniform pressure across the pipe surface so that the coatings on the bracket assembly and pipe are not chipped.

BRIEF DESCRIPTION OF THE DRAWINGS

A better understanding of the invention can be obtained when the detailed description of the preferred embodiments set forth below is considered in conjunction with the accompanying drawings, in which:

FIG. 2 is a front plan view partially in section showing in particular the bracket assembly and rotating head portions of the anchors;

FIG. 3 is a sectional view of the hinge portion of the bracket assembly looking along a section line shown in FIG. 2 in the direction of arrows 3—3; and FIG. 4 is a sectional view of an alternative embodiment of the hinge.

DETAILED DESCRIPTION OF A PREFERRED EMBODIMENT

Figure 1:
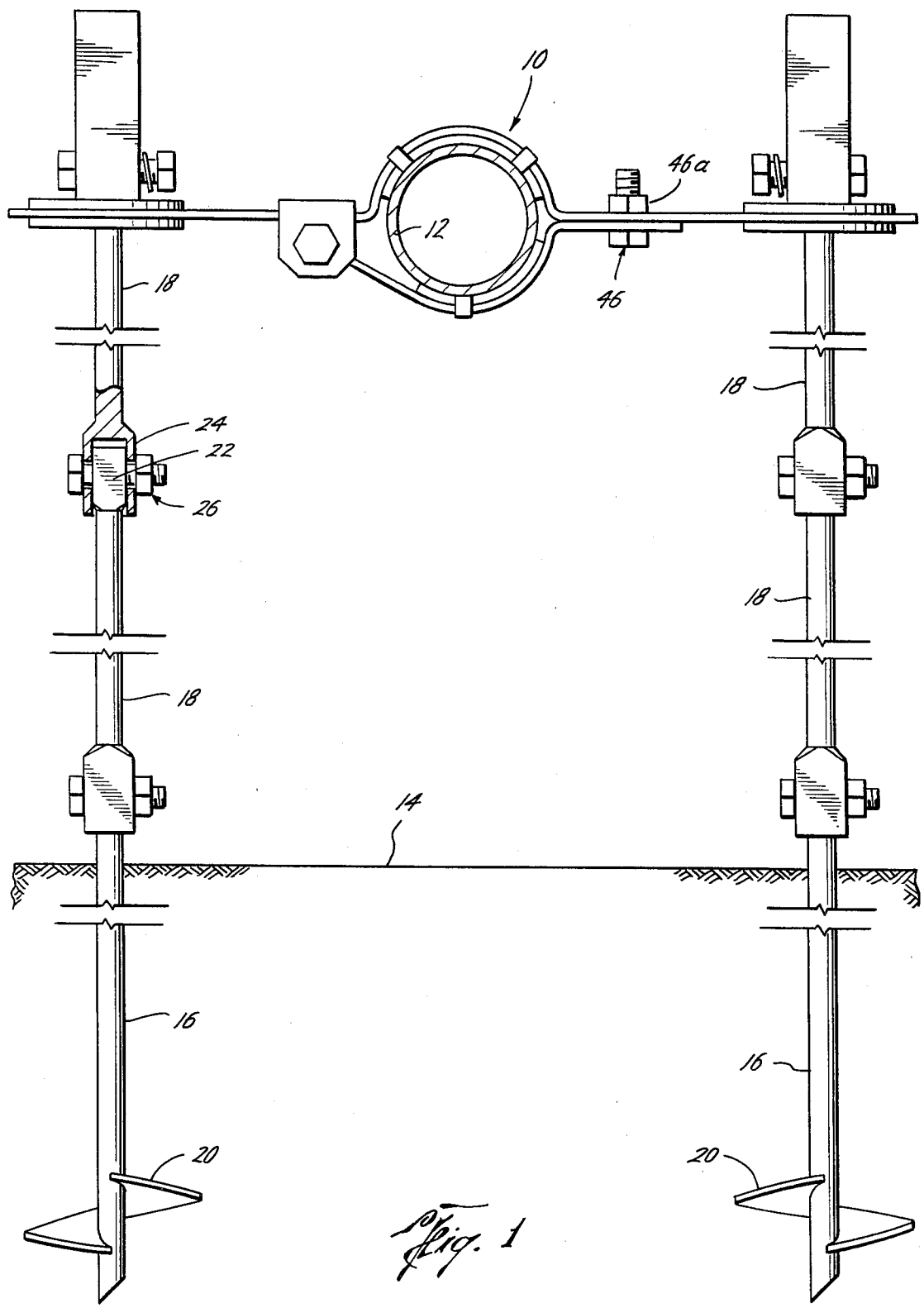
FIG. 1 is a front elevational view of an assembled pipe anchor showing the pipe firmly held in place.

FIG. 1 shows a bracket assembly generally designated by reference numeral 10 which is engaged to a length of pipe 12 and anchored in underwater strata 14 through suitable screw anchors 16 which are connected to the bracket assembly 10 through a suitable number of anchor extension rods 18, if necessary. The screw anchors 16 are known in the art and are formed with one or more helices 20 near their outer ends so that they can be rotated or screwed into the undersea surface 14 at an optimum depth for maximum holding power. The outer ends 22 of the anchor and extension rods are square and fit in square couplings 24 which are connected to each other through a suitable bolt and nut 26. The bracket assembly 10 and other elements which form the pipe anchor are all hot dip galvanized according to ASTM A-123 and A-153 for resisting corrosion.

As shown best in FIG. 2, the bracket assembly 10 includes an upper support section 28 which is generally curved to conform to the shape of the outer surface of the pipe 12, the support section 28 including lateral projections 30 which project outwardly away from the pipe so that the anchor rods 16 can be connected to the bracket assembly 10 in a way described in detail below. A lower support section 32 is connected to the upper support section 28 through a hinge generally designated by reference numeral 34.

The hinge 34 can be formed of a U-shaped bracket 36 which is mounted on one of the lateral projections 30 and includes complementary openings 38 in the leg portions of the "U". The bracket 36 is laterally movable relative to its respective projection 20 to facilitate installation. The lower support section 32 can be welded to a sleeve 40 as shown in FIGS. 2 and 3 which is connected to the bracket 36 through a suitable bolt and nut 42. Alternatively, the support section 36 can be welded to a pin 44 as shown in FIG. 4 which projects through the openings 38.

By providing a bracket assembly of this type, engagement with the pipe 12 is a simple matter of swinging the lower support section 32 into the position shown in FIG. 1 after the upper support section is in place over the pipe 12 and then installing a nut 46a on a bolt 46 which is welded on the lower support section 32 after the bolt 46 has been inserted through an elongated opening 48 located in the upper support section 28 which is about 3" in its longest dimension so that the bolt 46 can easily be inserted in the opening 48 throughout the full range of lateral movement of the bracket 36.

both the upper and lower support sections 28 and 32 are lined with protective pads 50 formed of nylon or other types of imputressible material, e.g. a material which does not deteriorate in water. Because of the expense of a material such as nylon, a suitable alternative has been found to be a material known as Sonoflex which is an asphalt impregnated fibrous material used in expansion joints and sold by Black-Brollier Building Material Company, Houston, Texas. The pads 50 can be connected to the support sections 28 and 32 by pieces of duct tape 52 or the like, and effectively eliminate single point contact along the pipe for better support, prevent the coatings on both bracket assembly and pipe from chipping, more equally distribute the bearing load and prevent cathodic protection for the pipeline from being interrupted.

The bracket assembly 10 can be installed by mounting it on the anchor rods 16 after they have been drilled into the underwater strata an appropriate distance. Torque is then applied to a square drive coupling 54 which is shaped as a socket to fit over the square upper end 22 of the uppermost extension rod 18 as shown in FIG. 2. A lower bearing washer 56 which has an outer diameter larger than an opening 58 located in the lateral projection 30 of the upper support section is welded onto the lower end of the drive coupling 54. In this way, after the drive coupling 54 is placed on the extension rod 18 the support bracket assembly 10 can be lowered into place and held by the bearing washers 56. An upper bearing washer 60 which also has an outer diameter larger than the opening 58 and an inner opening through which the drive coupling 54 can extend is placed over the lateral projection 30. A suitable bolt generally designated by reference numeral 62 is inserted through complementary openings 64 formed in the drive coupling 54 and the square outer end of the extension rod 18 and a nut 62a is threaded onto the nut 62, the bolt extending outwardly from the drive coupling 54 beyond the inner opening of the upper bearing washer 64 for holding the drive coupling in place and preventing it from falling below the position shown in FIGS. 1 and 2. A suitable lock washer 63 is provided for preventing the nut form becoming loosened.

Thus, there is provided in accordance with the invention a anchor coupling for underwater pipe for resisting pipe movement caused by currents, tides or the like. The coupling can be installed in minimum time which reduces installation costs by keeping diver time down. The coupling is designed to exert uniform pressure over the outer surface of the pipe so that the coatings on the pipe and the bracket assembly are not chipped.

The foregoing disclosure and description of the invention are illustrative and explanatory thereof, and various changes in the size, shape and materials as well as in the details of the illustrated construction may be made without departing from the spirit of the invention and all such changes are contemplated as falling within the scope of the appended claims.

I claim:
1. Pipeline anchoring device for anchoring a pipe to underground strata, comprising:
   (a) a first support section shaped to engage a first portion of the outer surface of the pipe;
   (b) a second support section shaped to engage a second portion of the outer surface of the pipe;
   (c) hinge means for connecting a portion of the second support section to the first support section on one side of the pipe so that the second support section can swing into and out of a position where the support sections surround the pipe and engage opposite sides of the outer surface of the pipe;
   (d) means for releasably connecting a portion of the second support section on the other side of the pipe from the hinge means to the first support section so that the support sections can be connected for supporting the pipe; and
   (e) one of the support sections including at least one portion projecting outwardly away from the pipe and an opening in said portion; and
   (f) anchor means including at least one elongated rod adapted to be driven into and become anchored in underground strata, an upper drive head on said rod of smaller cross-sectional dimensions than said opening, a drive coupling adapted to fit over the drive head, lower bearing means larger than at least part of said opening connected to the coupling for engaging and holding the lower surface of the said portion, upper bearing means larger than at least part of said opening and including an opening through which the drive coupling can project, and lock means for preventing the drive coupling from moving downward through the opening in said upper bearing means.
2. The device of claim 1, wherein the support sections are shaped to conform to the outer surface of the pipe.
3. The device of claim 1, wherein the lock means includes a bolt projecting through the drive coupling and drive head and a nut threadedly engaging the bolt.

4. The device of claim 1, wherein the hinge means includes a downwardly-facing U-shaped member connected to the projecting portion, a sleeve connected to the second support section, and a bolt engaging the two legs of the U-shaped member and projecting through the sleeve.

5. The device of claim 1, wherein the hinge includes a downwardly-facing U-shaped member mounted for lateral movement on the projection portion, a rod engaging the two legs of the U-shaped member, the second support section being connected to the rod.

6. The device of claim 5, wherein the means for releasably connecting includes a lateral projection formed on the second support section, said lateral projection and a cooperating projecting portion of the first support section including corresponding openings when the sections engage each other, and a bolt means connected to the second support section capable of projecting through the openings and joining the sections together when the support sections surround the pipe, the opening in the cooperating projecting portion being elongated to accommodate lateral movement of the U-shaped member.

7. The anchoring device of claims 1, and further including means for preventing metal-to-metal contact between the support sections and pipe for protecting the pipe and not interrupting the cathodic protection for the pipe when said anchoring device is adapted for use underwater.

8. The anchoring device of claims 1, wherein the lower bearing means includes a washer connected to a lower end of the coupling.

9. The anchoring device of claim 1, wherein the upper bearing means includes a washer through which the coupling projects.

10. The device of claim 1, and further including one of said support sections including portions projecting outwardly away from opposite sides of the pipe and an opening in each portion, and the anchor means of (f) provided for each portion.

* * * * *